Aug. 27, 1968    J. R. COX    3,398,965
QUICK CHANGE TOOL HOLDER
Filed May 26, 1966
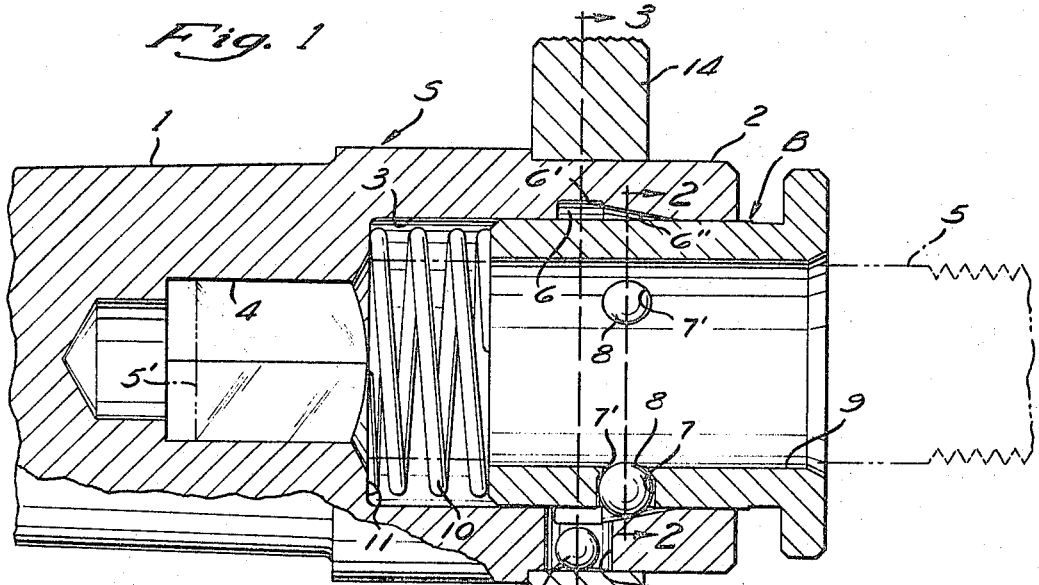
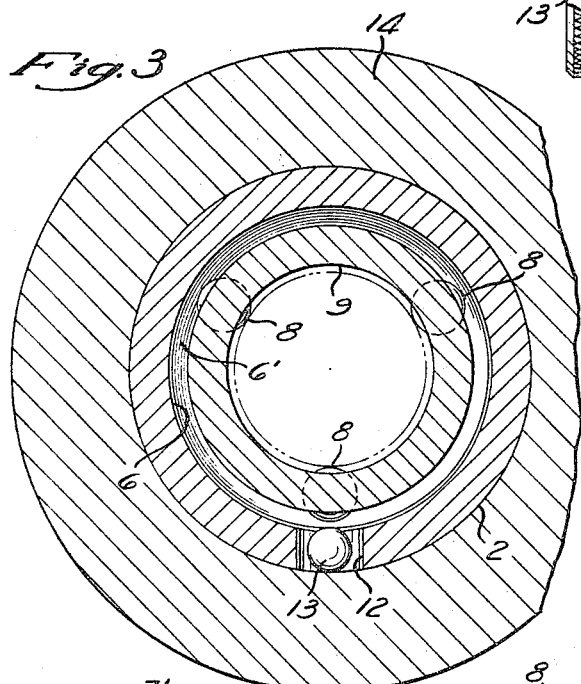
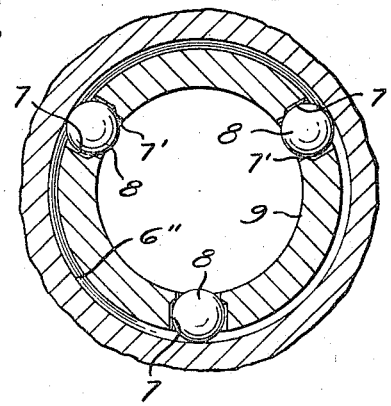
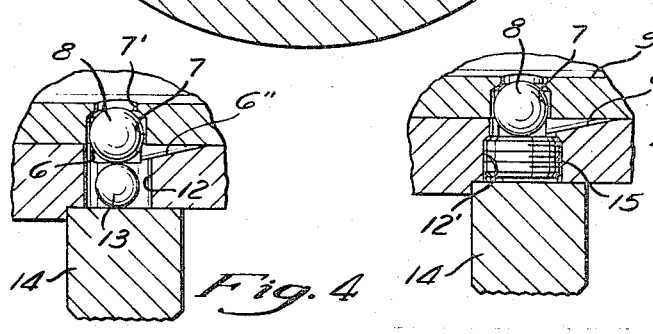
INVENTOR.
JOHN R. COX
BY Bosworth, Sessions
Herrstrom & Knowles
ATTORNEYS

United States Patent Office 3,398,965
Patented Aug. 27, 1968

3,398,965
QUICK CHANGE TOOL HOLDER
John R. Cox, Lakewood, Ohio, assignor to Balas Collet Company, Cleveland, Ohio, a corporation of Ohio
Filed May 26, 1966, Ser. No. 553,234
7 Claims. (Cl. 279—30)

This invention relates to tool holders and more particularly to quick change tool holders for holding taps, drills, etc. in machine tools or the like.

In automatic screw machines, drill presses and other machine tools tool holders are provided for holding a tool in proper position to engage the work piece in the manner desired. It is desirable that such tool holders be adapted to permit ready release and removal of one tool and replacement with another and they should also firmly hold the tool in proper operating position.

Accordingly, it is an object of the present invention to provide a tool holder of the type referred to above which will effectively perform the desired functions and which is particularly adapted for economical manufacture and long trouble-free service.

The above and other objects will appear from the following description, reference being had to the accompanying drawings in which:

FIGURE 1 is a longitudinal cross sectional view through a tool holder embodying my invention.

FIGURE 2 is a transverse cross sectional view taken substantially on line 2—2 of FIGURE 1.

FIGURE 3 is a transverse cross sectional view taken substantially on line 3—3 of FIGURE 1.

FIGURE 4 is a detached fragmentary view of the tool holder of FIGURE 1 showing the tool receiving bushing and one of the tool gripping balls in tool released position and illustrating the manner in which the tool gripping ball is prevented from entering the ball feeding hole.

FIGURE 5 is a view similar to FIGURE 4 but illustrating a modified form of ball blocking means.

As illustrated, my tool holder includes shank member S having a tapered portion 1, which is adapted to be received by a suitable tool support in the machine tool, and an open ended tubular portion 2 which is open at its outer end and has a cylindrical inner wall 3 in which the tubular tool receiving bushing B has a sliding fit.

At the inner end of the tubular portion 2 of shank S is a non-cylindrical (square in cross section as illustrated) tool driving portion 4 adapted to receive the correspondingly non-cylindrical end 5' of a tool 5 which is illustrated in phantom lines in the form of a tap.

A radially outwardly extending circumferential groove 6 is formed in the cylindrical inner wall 3 of the shank S and extends radially outwardly of said wall. This groove is spaced inwardly from the open (right hand) end of the tubular portion 2 and has a base portion 6' and an inclined conical cam face portion 6" which slopes inwardly to the inner wall 3.

Extending through the wall of the tool receiving bushing B is a plurality (three as illustrated) of circumferentially spaced apart ball retaining apertures 7. These apertures are adapted to receive and retain the tool gripping balls 8 and have their inner ends of a reduced diameter 7' which is smaller than the diameter of the balls 8 whereby the balls may extend into the tool receiving bore 9 of the bushing B to grip the tool but may not pass completely through the reduced diameter 7'. The outer end portions of the apertures 7 are, as clearly seen in FIGURE 1, slightly larger than the diameter of the balls 8 to permit free radial movement of the balls therein.

One end of a compression spring 10 abuts a shoulder 11 at the inner end of tubular portion 2 and the other end engages the inner end of the bushing B. This spring urges the bushing B outwardly in tool gripping direction at all times and it will be observed that, when a tool 5 is positioned in the bushing B, the balls 8 will be moved radially inwardly into gripping engagement with the tool by the action of the inclined cam face portion 6" of the groove 6. Any force acting to move the tool out of the holder will merely cause the balls 8 to grip the tool more tightly because of their engagement with the inclined cam face 6" and thus the tool is firmly and accurately held against outward movement. This tool gripping position of the parts is seen at FIGURE 1.

To release tool 5 to permit withdrawal thereof, it is only necessary to push inwardly (to the left in FIGURE 1) on the outer end of bushing B so that it slides into the shank S against the spring 10 until the balls 8 overlie the base portion 6' of the groove 6 whereby their gripping engagement with the tool 5 is released and the tool may be readily withdrawn.

To insert a new tool it is only necessary to push it into the bore 9 of bushing B with its driving end properly aligned with the non-cylindrical driving portion 4 of the shank 1. This inward movement will not be restricted because the bushing B and the balls 8 may move inwardly (to the left in FIGURE 1) without gripping the tool. After the tool is pushed all the way in and released the spring 10 will urge the bushing B outwardly (to the right) causing the inclined cam face 6" to move the balls 8 radially inwardly and firmly grip the tool 5 and prevent withdrawal thereof as previously described.

In order to assemble the bushing B and the retaining balls 8 as described above a ball feeding hole 12 is provided which extends radially through the wall of the tubular portion 2 of the shank S into the groove 6. In assembling the device the bushing B is inserted into the bore in the tubular portion 2 until the ball retaining apertures 7 are aligned with the groove 6. The bushing is then rotated until one of the apertures 7 is aligned with the ball feeding hole 12 and a ball 8 is dropped through the hole 12 into the aperture 7. The sleeve B is then rotated, the just inserted ball 8 travelling in the groove 6, until the next aperture 7 is aligned with the ball feeding hole 12 and another ball is dropped into position. This operation is continued until balls 8 have been placed in all of the apertures 7. Upon release of the bushing B the spring 10 will move it outwardly and the inclined cam face 6" will urge the balls 8 radially inwardly until they seat in the reduced diameter portions 7' of the apertures 7 whereupon outward movement of the bushing B will be stopped.

To retain the balls 8 in the tool holder and prevent them from moving outwardly into the ball feeding hole 12 in case one of the apertures 7 should become aligned therewith, a blocking ball 13 is dropped into the hole 12 and the blocking ball retaining sleeve 14 is forced with a press fit over the end of the tubular portion 2 until it overlies and closes the outer end of the hole 12. The blocking ball 13 may be the same or of a different diameter than the balls 8 but is sufficiently large in diameter, relative to the radial length of the hole 12 and the wall thickness of the tubular portion 2 of the shank S, so that, as best seen in FIGURE 4, when an aperture 7 is aligned with the ball feeding hole 12 the blocking ball 13 will permit the gripping ball 8 to move outwardly into the groove 6 completely out of the inner bore 9 of the bushing B but will positively prevent the ball 8 from entering the ball feeding hole 12 sufficiently far to remain therein or to restrict rotary movement of the bushing B in the tubular portion 2.

I have illustrated the ball blocking member in the form of a ball 13 but it will be understood that it may take other forms such as a non-spherical loose plug member of suitable size and shape or, as illustrated in FIGURE 5, a threaded plug 15 screwed into a correspondingly threaded ball feeding hole 12'.

Although the illustrated embodiments of my invention have been described in considerable detail it will be understood that modifications and variations may be made in the specific form, proportions and arrangement of the parts making up my improved tool holder. Accordingly, I do not wish to be limited to the exact details of the device herein shown and described but claim as my invention all embodiments thereof coming within the scope of the appended claims.

I claim:

1. A tool holder comprising a shank member having an open ended tubular portion at one end, said tubular portion having a cylindrical inner wall and a radially outwardly extending circumferential groove in said wall, said groove being spaced inwardly from the open end of said tubular portion and having a base portion and an inclined conical cam face portion extending from said base portion to said inner wall, said shank member having a ball feeding hole extending radially through said tubular portion into said groove in alignment with said base portion thereof, a tubular tool receiving bushing having a sliding fit in said tubular portion of said shank member and having an inside diameter adapted to receive a tool to be held, said bushing having a plurality of circumferentially spaced apart ball retaining apertures extending radially through the wall thereof, said apertures being of smaller diameter at their inner ends than at their outer ends, tool gripping balls radially movably supported in said apertures and circumferentially movable in said groove in said shank member when said apertures are aligned therewith, the diameter of said balls being greater than said smaller inner end diameter of said apertures and smaller than the diameter of said ball feeding hole, said inclined cam face of said groove being adapted to move said balls radially inwardly in said ball retaining apertures into gripping engagement with a tool in said bushing when said bushing is moved axially outwardly of said shank member, spring means for urging said bushing outwardly of said shank member, ball blocking means in said ball feeding hole for blocking said balls against movement radially out of said apertures in said tubular bushing, and means for retaining said ball blocking means in said ball feeding hole.

2. A tool holder according to claim 1 in which said ball blocking means in said ball feeding hole comprises a plug member disposed in said hole and adapted to block movement of said tool gripping balls out of said ball retaining apertures into said hole when said ball retaining apertures are in alignment with said hole.

3. A tool holder according to claim 2 in which said means for retaining said ball blocking means in said ball feeding hole comprises a sleeve member on said shank member overlying and closing the outer end of said ball feeding hole.

4. A tool holder according to claim 2 in which said ball blocking plug is loosely disposed in said ball feeding hole.

5. A tool holder according to claim 1 in which said ball blocking means comprises a blocking ball loosely disposed in said ball feeding hole and of a diameter greater than the depth of said groove, the length of said hole in relation to the diameter of said blocking ball being such that said tool gripping balls are blocked against outward movement out of their ball retaining apertures.

6. A tool holder according to claim 5 in which said means for retaining said ball blocking means in said ball feeding hole comprises a sleeve member retained on said shank member and overlying the outer open end of said ball feeding hole.

7. A tool holder according to claim 2 in which said ball blocking plug has threaded engagement in said ball feeding hole.

References Cited
UNITED STATES PATENTS

| | | | |
|---|---|---|---|
| 1,636,421 | 7/1927 | Knott | 279—75 |
| 1,861,099 | 5/1932 | Smith | 279—75 |
| 1,938,440 | 12/1933 | Richard | 279—30 |
| 2,010,210 | 8/1935 | Witt | 279—82 |
| 2,807,473 | 9/1957 | Kiehne | 279—82 |

ROBERT C. RIORDON, *Primary Examiner.*

J. C. PETERS, *Assistant Examiner.*